United States Patent [19]

Dunn

[11] Patent Number: 5,447,020

[45] Date of Patent: Sep. 5, 1995

[54] COLLECTION DEVICE FOR GRASS CUTTING MACHINES

[75] Inventor: Ken Dunn, Darlington, England

[73] Assignee: Electrolux Outdoor Products Limited, Durham, England

[21] Appl. No.: 209,110

[22] Filed: Mar. 9, 1994

[30] Foreign Application Priority Data

Mar. 11, 1993 [GB] United Kingdom ............... 9304952

[51] Int. Cl.6 .................. A01D 34/70; A01D 87/10
[52] U.S. Cl. ........................ 56/12.8; 56/202; 56/DIG. 8
[58] Field of Search ............ 56/12.8, 13.3, 13.4, 56/202, DIG. 3, DIG. 8

[56] References Cited

U.S. PATENT DOCUMENTS

| | | | |
|---|---|---|---|
| 4,407,112 | 10/1983 | Shepherd et al. | 56/13.4 |
| 4,631,909 | 12/1986 | McLane | 56/202 |
| 4,738,086 | 4/1988 | Dunn | 56/249 X |
| 4,974,403 | 12/1990 | Fukui et al. | 56/202 |
| 5,113,642 | 5/1992 | Dunn | 56/12.8 |
| 5,224,326 | 7/1993 | Dunn | 56/12.8 |

*Primary Examiner*—David J. Bagnell
*Attorney, Agent, or Firm*—Pearne, Gordon, McCoy & Granger

[57] ABSTRACT

A grass cutting machine comprising a chassis including a chamber for receiving a cushion of air for supporting the chassis, a cutting member, a power source, a drive line for drivingly connecting the power source and the cutting member, a source of pressure air, and a grass collection device. The collection device comprises a receptacle for receiving cut grass and includes a base wall, an upper wall, and at least one side wall. The receptacle has at least one inlet disposed externally of the chamber and in the region of the base wall for entry of cut grass entrained in a stream of air directly into the receptacle part of at least the base wall includes an air permeable region to retain cut grass in the receptacle and to permit the said stream of air to be drawn through cut grass retained in the receptacle and through the air permeable region in the bases wall so as, to filter the air stream and compact the cut grass in the receptacle.

19 Claims, 2 Drawing Sheets

COLLECTION DEVICE FOR GRASS CUTTING MACHINES

This invention relates to grass cutting machines and particularly to means for effectively collecting cut grass produced by such machines. Grass cutting machines can be divided into two major categories, namely, those in which grass is cut using a multi-bladed cylindrical cutter with its axis of symmetry mounted for rotation about a substantially horizontal axis the so called cylinder mower and those in which a cutting member is mounted for rotation about a vertical axis and cutting is performed in a substantially horizontal plane the so called hover mower which may also be supported on wheels and/or rollers in which case they are referred to as wheeled/rotary mowers. A form of combined mower has been proposed in which a mower having a cylindrical cutter is at least partially supported in a cushion of air. Such a combined mower is described in our prior U.S. Pat. No. 4,738,086 which is incorporated herein in its entirety by reference. The present invention, although specifically exemplified herein with reference to hover mowers, is equally applicable to the other categories of mowers mentioned above.

Conventionally, grass cut by cylinder mowers is thrown into a grass box by virtue of a force applied to the cuttings due to rotation of the cylindrical cutter. In the case of rotary mowers, cut grass may be forced into a grass collector directly by action of the rotating cutting member which may or may not be formed with auxiliary fins for forming an air stream during cutting. Alternatively, or in addition the air stream may be produced by an impeller. In either case cut grass is entrained in the stream of air and transported into a grassbox.

The position of cut grass in a grass collector fitted to any of the above types of mower is effected quantitatively, that is, by the effect of the forces transporting the cut grass and, as these forces diminish, the weight of the grass cuttings per se causes deposition thereof in the grass box.

It is an object of the present invention to improve the grass collecting capabilities of the various grass cutting machines mentioned above by compacting cuttings collected in the grass box.

According to the present invention a grass cutting machine comprises a chassis, a cutting member, a power source, a drive line for drivingly connecting the power source and the cutting member, means for creating a stream of pressure air, a grass collection device, means for removably supporting the collection device on the machine, the collection device comprising a receptacle for receiving cut grass, the receptacle having at least one inlet for entry of cut grass entrained in a stream of air from said source and including a base wall, an upper wall and one or more side walls, a part of at least one of the base and side walls including an air permeable region to retain cut grass in the receptacle and to permit the said stream of air to be drawn by said source through cut grass retained in the receptacle and through each air permeable region thereby serving, in use, to filter the air stream and compact the cut grass in the receptacle.

The invention also includes a receptacle for a grass cutting machine.

The invention will now be described by way of example, with reference to the accompanying drawings in which:

FIG. 1 shows conventional hover-mower; where grass cuttings are drawn into a collection box 1 in a main airstream and, subsequently, "fall out" of the flow of air, into the box, with nothing more than the force of gravity compacting the grass clippings.

Figure 1:
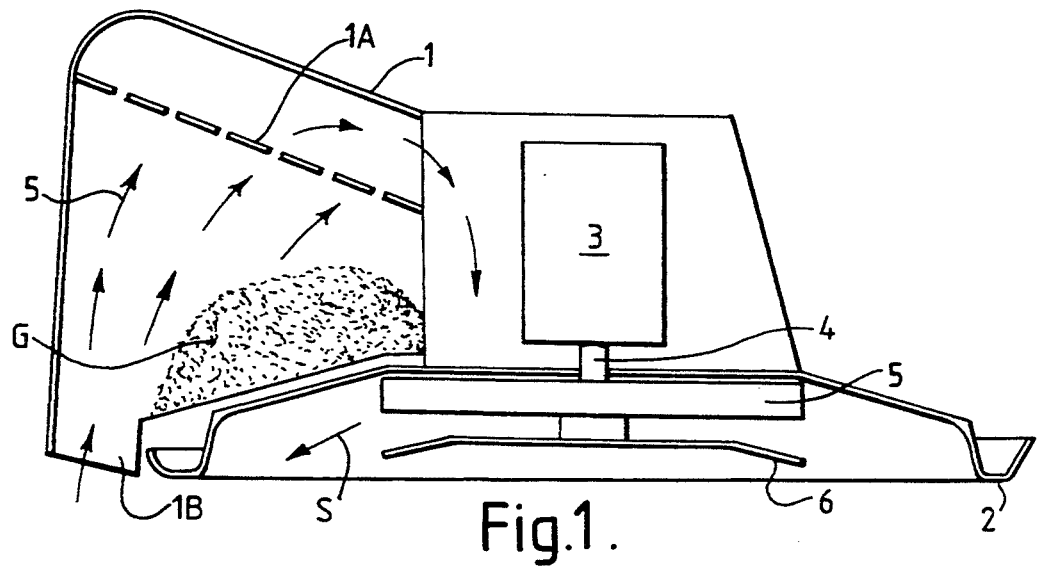
FIG. 1 is a schematic longitudinal cross-section of a conventional hover mower in which cut grass is quantitatively deposited in a grass collector.

The conventional hover-mower of FIG. 1 has a chassis 2 (sometimes referred to in the art, as a hood), a motor 3 which may be an electric motor or an internal combustion engine. The motor has an output drive shaft 4 on which an impeller 5 and cutting member 6 are coaxially mounted. The grass collection box 1 is removably mounted on the chassis and a filter 1A serves, in use, to separate grass cuttings G from the recirculating main air stream as indicated by arrows 5 produced by the impeller to effect both hover and grass collection, the grass-cuttings entering the collection box through inlet 1B.

Figure 2:
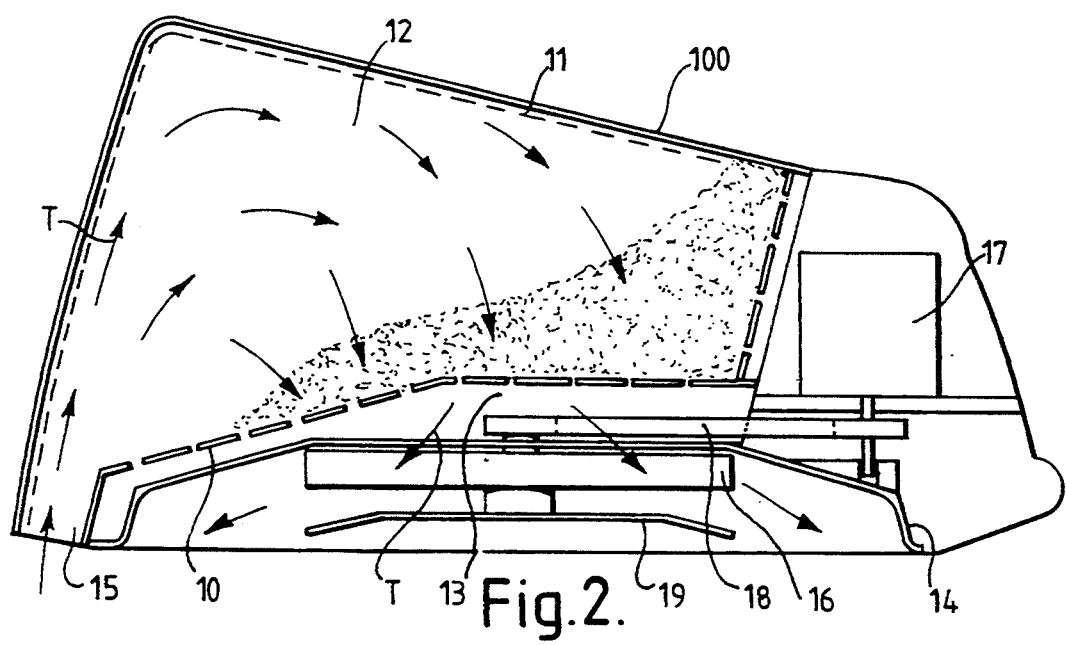
FIG. 2 is a cross-section similar to FIG. 1 according to the present invention and FIG. 3 is a cross-section similar to FIG. 1 of a combined cylinder and hover mower according to the present invention.

Referring to FIG. 2 the main recirculating airstream passes, in use, under suction through the grass cuttings in the collection box thereby compacting the clippings as the box fills up. This method of grass collection results in more grass cuttings being collected in the same volume of the collection box of the embodiment of FIG. 1.

A grass collection box 100 is mounted on a chassis 14 and includes a receptacle removably supported therein and indicated by dotted lines. The receptacle has a base 10, upper 11 and side walls 12 made wholly from or containing regions which are permeable to air. A plenum chamber 13 is disposed between the base 10 and the chassis 14. In operation a stream of air is created by an impeller member 16 which is coaxially mounted with a cutting member 19 and is indirectly driven by a motor 17 via a belt 8. The stream of air follows a clockwise motion indicated by arrows T and entrains grass cuttings which are led into the collection box 100 via inlet 15. The suction effect caused by operation of the impeller draws the entrained grass cuttings into the grass box to compact them on the air permeable base wall 10. Thus air from the air stream is filtered as it passes through the compacted cuttings.

An advantage of the present invention is that grass cuttings are compacted in the region of the centre of gravity of the machines thereby serving to keep the machine substantially parallel to the grass being cut and producing a relatively even cut.

Figure 3:
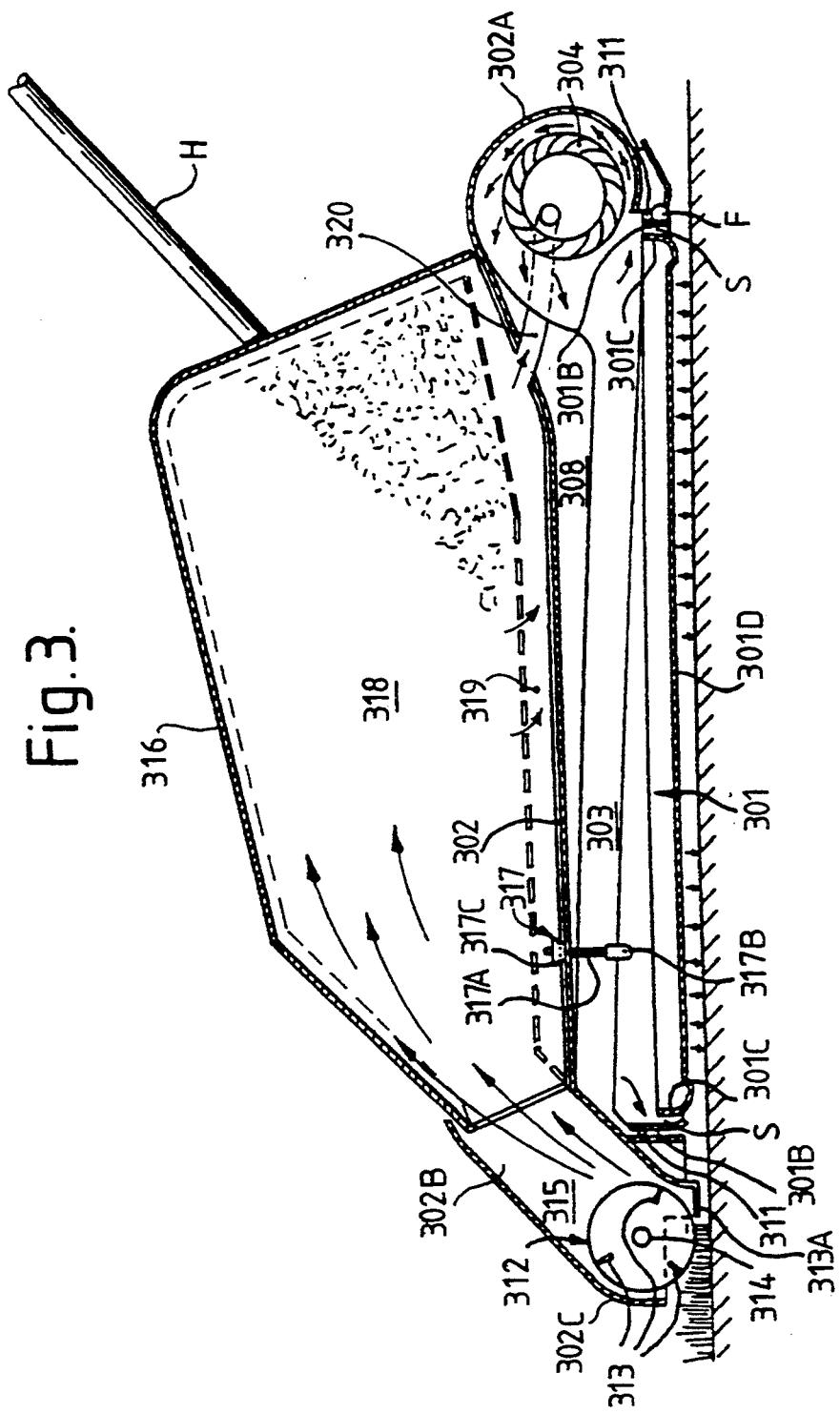

Referring to FIG. 3, the grass box includes a receptacle constructed in a manner similar to that of FIG. 2. Air is again drawn through the grass cuttings into a plenum chamber thereby assisting hovering of the machine.

Referring to FIG. 3, a lower hood 301 is hinged at F to an upper hood 302 to form a plenum chamber 303 therebetween. The upper hood 302 also includes a portion 302A which constitutes a casing for an air pump unit 304. The air pump unit is driven by a coaxially disposed electric motor (not shown). A high mass flow of pressure air from the pump unit or impeller 304 enters the plenum chamber 303 through a channel 308 formed in the upper hood 302.

A peripheral slot S extends around the periphery of the lower hood 301 and is formed by appropriately shaped flanges 301B and 301C. The flange 301B is a downwardly extending peripheral side flange of the lower hood 301 and the flange 301C is a peripheral side flange extending upwardly from base 301D of the lower hood 301. The flanges 301B and 301C are shown in FIG. 3 to be inclined inwardly to direct pressurised air beneath and inwardly of the periphery of the base 301D. Further, a seal 311 between the upper and lower hoods substantially seals the plenum chamber 303 from atmosphere other than via the peripheral slot.

A cylindrical cutting unit 312 having three cutting blades 313 is mounted at the forward end of the mower and has an axle 314 supported in bearings not shown carried in side panels 302B of the upper hood 302. Forward end portions of the side panels 302B and a nose portion 302C of the upper hood 302 create a duct 315 through which grass cuttings are thrown into a grass collector 316 removably supported upon the upper deck surface of the upper hood 302. The grass collector 316 is accurately located on the grass collector on the upper hood A. A handle not shown is formed in the upper region of the collector.

The cutting unit 312 is driven by a conventional pulley, gear, or other drive line (not shown) from the electric motor. Further, the cutting unit 312 operates in conjunction with a conventional fixed blade 313A.

In order to adjust the height of cut of the grass, the lower hood 301 is supported from the upper hood 302 by two adjusting screw devices 317. Each adjusting screw device 317 includes a threaded rod 317A pivotally attached at 317B to the lower hood 301 and an adjusting nut 317C. Thus, the axial position of the nut 317C on the rod 317 determines the angular orientation of the lower hood about the pivot F and consequently, the height of the cut. The mower is fitted with a handle H the angle of which may be adjusted in conventional manner by a user. In the mower of FIG. 3 grass cuttings are urged into the collector 316 first by virtue of the momentum applied to the cuttings by the rotatable cylindrical cutter 312 in the conventional manner, and secondly, under a suction force applied by a fan in the manner described above with reference to FIG. 2. In FIG. 3 the grass collector 316 and receptacle 318 are adequately sealed with respect to each other and air from Chamber 319 is drawn into the impeller 304 through ducting 320 for recirculation.

I claim:

1. A grass cutting machine comprising a chassis including a cutting chamber, a cutting member mounted for rotation in the cutting chamber, a power source, a drive line for drivingly connecting the power source and the cutting member, means for creating a stream of pressure air, a receptacle for collecting cut grass, means for removably supporting the receptacle on the machine, the receptacle including a base wall, an upper wall and at least one side wall, a part of at least the base wall including an air permeable region to retain cut grass in the receptacle, the receptacle having at least one inlet disposed externally of the cutting member and in a region of the base wall for entry of cut grass entrained in the stream of air directly into the receptacle, a plenum chamber disposed between at least said air permeable region of the base wall and the means for creating the stream of pressure air, said air permeable region permitting, in use, said stream of air to be drawn by said means for creating the stream of pressure air through cut grass retained in the receptacle and through said air permeable region which serves to filter the stream of air which compacts the cut grass in the receptacle.

2. A machine according to claim 1 wherein the receptacle is supported within an outer casing.

3. A machine according to claim 1 wherein said cutting member is adapted for receiving a cushion of air for supporting the chassis.

4. A grass cutting machine comprising a chassis including a cutting chamber for receiving a cushion of air for supporting the chassis, a cutting member mounted for rotation in the cutting chamber, a power source, a drive line for drivingly connecting the power source and the cutting member, means for creating a stream of pressure air, a receptacle for collecting cut grass, means for removably supporting the receptacle on the machine, the receptacle including a base wall, an upper wall and at least one side wall, a part of at least one of the base and side walls including an air permeable region to retain cut grass in the receptacle, the receptacle having at least one inlet disposed externally of the cutting chamber and in a region of the base wall for entry of cut grass entrained in the stream of air directly into the receptacle, said air permeable region permitting, in use, said stream of air to be drawn by said means for creating the stream of pressure air through cut grass retained in the receptacle and through said air permeable region which serves to filter the stream of air leading to the means for creating the stream of pressure air and to compact the cut grass in the receptacle.

5. A machine according to claim 1 or claim 4 wherein the base wall includes an air permeable region constituting a supporting member for the cut grass retained in the receptacle wherein the supporting member is disposed in spacial relationship relative to the said source of pressure air to form an air chamber between the said supporting member.

6. A machine according to claim 5 wherein said supporting member is disposed in spacial relationship relative to said means for creating the stream of pressure air to form an air chamber between said supporting member and said means for creating the stream of pressure air.

7. A machine according to claim 6 wherein said air chamber is a plenum chamber.

8. A machine according to claim 1 or claim 4 wherein the cutting member is a cutting blade mounted for rotation in a substantially horizontal plane within said cutting chamber.

9. A machine according to claim 8 wherein the means for creating the stream of pressure air is an impeller mounted for coaxial rotation with the cutting blade and drivable by the power source via said drive line.

10. A machine according to claim 9 wherein the drive line is an output shaft from the power source with the impeller and the cutting blade is mounted for coaxial rotation with the impeller.

11. A machine according to claim 1 or claim 4 wherein the air permeable region acts, in use, to retain cut grass in the receptacle substantially around a center of gravity of the machine.

12. A machine according to claim 1 or claim 4 wherein said at least one inlet for entry of cut grass is disposed externally of the chassis.

13. A machine according to claim 1 or claim 4 further comprising a duct extending into the receptacle from the inlet of the receptacle.

14. A machine according to claim 1 or claim 4 wherein the base wall and each side wall is air permeable.

15. A machine according to claim 1 or claim 4 wherein the receptacle is removably mounted within a collection device with the base and side walls disposed in spaced relationship with the collection device, said spacial relationship affording communication between the interior of the receptacle and the means for creating the stream of pressure air via air permeable regions in the side walls.

16. A machine according to claim 15 wherein cut grass is collected directly from the cutting member.

17. A machine according to claim 1 or claim 4 wherein said cutting member is rotatable about a horizontal axis of rotation.

18. A machine according to claim 17 wherein said cutting member includes a fixed blade.

19. A machine according to claim 17 wherein said cutting member is mounted for rotation within said at least one inlet.

* * * * *

UNITED STATES PATENT AND TRADEMARK OFFICE
CERTIFICATE OF CORRECTION

PATENT NO. : 5,447,020
DATED : September 5, 1995
INVENTOR(S) : Dunn

It is certified that error appears in the above-indentified patent and that said Letters Patent is hereby corrected as shown below:

Column 3, line 15, delete "slot." and insert --slot S.--.

Column 4, lines 38-41, delete "wherein the supporting member is disposed in spacial relationship relative to the said source of pressure air to form an air chamber between the said supporting member".

Signed and Sealed this

Sixth Day of February, 1996

Attest:

BRUCE LEHMAN

*Attesting Officer*          *Commissioner of Patents and Trademarks*